(12) United States Patent
Singleton et al.

(10) Patent No.: US 8,854,763 B2
(45) Date of Patent: Oct. 7, 2014

(54) SYSTEMS AND METHODS FOR MANAGED OPERATIONAL MARGINALIZATION

(71) Applicant: LSI Corporation, Milpitas, CA (US)

(72) Inventors: Jefferson Singleton, Westminster, CO (US); Shaohua Yang, Santa Clara, CA (US)

(73) Assignee: LSI Corporation, San Jose, CA (US)

(\*) Notice: Subject to any disclaimer, the term of this patent is extended or adjusted under 35 U.S.C. 154(b) by 0 days.

(21) Appl. No.: 13/722,207

(22) Filed: Dec. 20, 2012

(65) Prior Publication Data
US 2014/0177084 A1 Jun. 26, 2014

(51) Int. Cl.
| | |
|---|---|
| *G11B 5/035* | (2006.01) |
| *G11B 5/09* | (2006.01) |
| *G11B 20/10* | (2006.01) |
| *G06F 11/10* | (2006.01) |
| *G11B 20/12* | (2006.01) |

(52) U.S. Cl.
CPC ............ *G06F 11/10* (2013.01); *G11B 20/1217* (2013.01)
USPC ............................................. 360/65; 360/39

(58) Field of Classification Search
None
See application file for complete search history.

(56) References Cited

U.S. PATENT DOCUMENTS

| | | | |
|---|---|---|---|
| 7,064,913 B2 | 6/2006 | Gunderson et al. | |
| 7,372,651 B2 | 5/2008 | Gunderson et al. | |
| 7,570,447 B2 | 8/2009 | Koga et al. | |
| 7,990,648 B1 | 8/2011 | Wang | |
| 2003/0128448 A1 | 7/2003 | Gunderson et al. | |
| 2004/0003724 A1 | 1/2004 | Ellis | |
| 2005/0117263 A1* | 6/2005 | Seigler | 360/313 |
| 2005/0201003 A1* | 9/2005 | Shishida et al. | 360/77.04 |
| 2010/0211803 A1* | 8/2010 | Lablans | 713/193 |
| 2013/0047053 A1* | 2/2013 | Jin et al. | 714/758 |

OTHER PUBLICATIONS

U.S. Appl. No. 13/686,164, filed Nov. 27, 2012, Matthew et al.
U.S. Appl. No. 13/710,351, filed Dec. 10, 2012, Lu, Lu et al.
U.S. Appl. No. 13/686,164, Unpublished (filed Nov. 27, 2012) (George Mathew).

\* cited by examiner

*Primary Examiner* — Daniell L Negron
(74) *Attorney, Agent, or Firm* — Hamilton DeSanctis & Cha

(57) ABSTRACT

Systems, methods, devices, circuits for data processing, and more particularly to data processing including operational marginalization capability.

20 Claims, 4 Drawing Sheets

US 8,854,763 B2

SYSTEMS AND METHODS FOR MANAGED OPERATIONAL MARGINALIZATION

FIELD OF THE INVENTION

Embodiments are related to systems and methods for data processing, and more particularly to systems and methods for managed degradation of a data processing system.

BACKGROUND

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. The data processing includes application of various data processing algorithms to recover originally written data. Such processing results in a very small number of errors that in some cases are due to corruption of the originally received data. Such a level of errors make it difficult to make adjustments to either correct for the type of errors or make it difficult to characterize the quality of a device.

Hence, for at least the aforementioned reasons, there exists a need in the art for advanced systems and methods for data processing.

SUMMARY

Embodiments are related to systems and methods for data processing, and more particularly to systems and methods for managed degradation of a data processing system.

Various embodiments of the present invention provide data processing systems that include a known data based noise injection circuit and a processing circuit. The known data based noise injection circuit is operable to: calculate a noise component based upon a data input and a corresponding known pattern; add a noise value derived from the noise component to a corresponding instance of the data input to yield a noise injected output; and select one of the data input and the noise injected output as a processing input. The processing circuit is operable to apply a data processing algorithm to the processing input to yield a data output.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1:
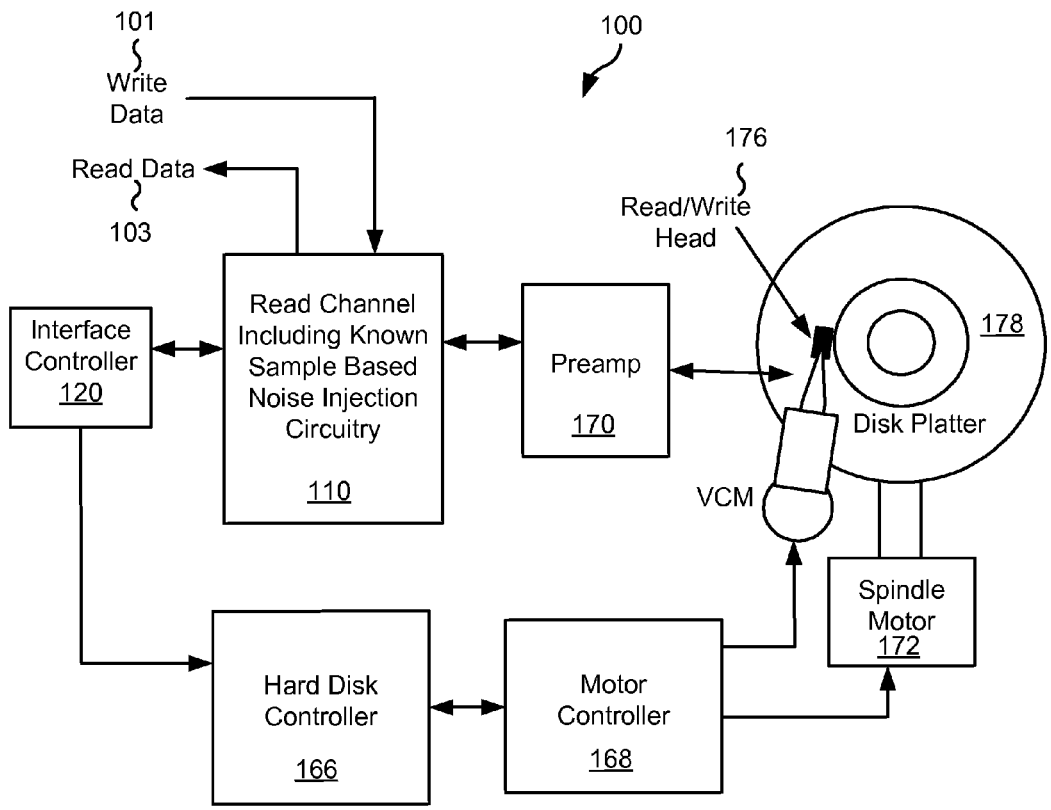
FIG. 1 shows a storage system including known pattern based noise injection circuitry in accordance with various embodiments of the present invention.

Embodiments are related to systems and methods for data processing, and more particularly to systems and methods for managed degradation of a data processing system.

Various embodiments of the present invention provide data processing systems. The data processing systems include a known pattern based noise injection circuitry. Such known pattern based noise injection circuitry is operable to: calculate a noise component based upon a combination of an equalized output and a known pattern that corresponds to the data expected to be received as equalized output; scale the noise component to yield a scaled noise output; and add the scaled noise output to the equalized output to yield a noise injected output. Where managed operational degradation is desired, the noise injected output is selected as a processing data input, and a bit error rate is calculated based upon the results achieved when processing the scaled noise output. In contrast, when standard data processing is desired, the equalized output is selected as a processing data input.

Various embodiments of the present invention provide data processing systems that include a known data based noise injection circuit and a processing circuit. The known data based noise injection circuit is operable to: calculate a noise component based upon a data input and a corresponding known pattern; add a noise value derived from the noise component to a corresponding instance of the data input to yield a noise injected output; and select one of the data input and the noise injected output as a processing input. The processing circuit is operable to apply a data processing algorithm to the processing input to yield a data output.

In some instances of the aforementioned embodiments, the data processing system further includes a storage circuit operable to store the known pattern. In some such instances, the known pattern is comprised of expected values of the data input pre-stored to the storage circuit. In various instances of the aforementioned embodiments, the known data based noise injection circuit is further operable to multiply the noise component by a scalar value to yield a scaled noise component, wherein the noise value is the scaled noise component. In some cases, the scalar is programmable.

In one or more instances of the aforementioned embodiments, the systems further include a data detector circuit and a bit error rate monitor circuit. The detector circuit is operable to apply a data detection algorithm to the processing input to yield a detected output. The bit error rate monitor circuit is operable to generate a bit error rate based at least in part on a combination of the known pattern and the detected output. In some cases, the bit error rate monitor is operable to XOR corresponding instances of the known pattern and the detected output to yield an error indicator. In particular cases, the bit error rate monitor is further operable to calculate a ratio of the number of times the error indicator indicates an error to a total number of bits processed.

Other embodiments of the present invention provide methods for data processing. The methods include: receiving a data input at a noise injection circuit; calculating a difference between the data input and a known pattern by the noise injection circuit to yield a noise component; adding a noise value derived from the noise component to a corresponding instance of the data input to yield a noise injected output; selecting one of the noise injected output and the data input as a processing input; and applying a data processing algorithm to the processing input to yield a data output. In some instances of the aforementioned embodiments, the methods further include storing the known pattern to a storage area of the noise injection circuit. In some cases, the known pattern is comprised of expected values of the data input pre-stored to the storage area. In one or more instances of the aforementioned embodiments, the methods further include scaling the noise component to yield a scaled noise component. In such cases, the noise value is the scaled noise component.

Yet other embodiments of the present invention provide storage devices. Such storage devices include: storage medium operable to maintain a known read pattern; a head assembly disposed in relation to the storage medium and operable to provide a sensed signal corresponding to the known read pattern on the storage; and a read channel circuit. The read channel circuit includes: an analog front end circuit operable to provide an analog signal corresponding to the sensed signal; an analog to digital converter circuit operable to sample the analog signal to yield a series of digital samples; an equalizer circuit operable to equalize the digital samples corresponding to the data set to yield a sample set; and a known data based noise injection circuit. The known data based noise injection circuit is operable to: calculate noise components based upon the sample set and corresponding instances of a known pattern; add noise values derived from the noise components to corresponding instances of the sample set yield a noise injected output; and select one of the data input and the noise injected output as a processing input; and a processing circuit operable to apply a data processing algorithm to the processing input to yield a data output.

In some instances of the aforementioned embodiments, the read channel circuit further includes a storage circuit operable to store the known pattern. In one or more cases, the known pattern is comprised of expected values of the data input pre-stored to the storage circuit. In various instances of the aforementioned embodiments, the known data based noise injection circuit is further operable to: multiply the noise components by a scalar value to yield scaled noise components. In such instances, the noise values are the scaled noise components.

Turning to FIG. 1, a storage system 100 including a read channel circuit 110 having known pattern based noise injection circuitry is shown in accordance with various embodiments of the present invention. The utilized known pattern corresponds to an input expected to be received by read channel circuit 110, and may be stored to a memory area of the read channel circuit 110 and accessed when desired. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

As part of a device characterization process, read channel circuit 110 monitors a received input stream for a synchronization mark. Once the synchronization mark is found, data received from the disk is modified by injecting a noise component generated based at least in part on a known data pattern and the data accessed from disk platter 178. The noise being added is designed to raise a minimal error rate generally yielded by read channel circuit 110 to an error rate that can meaningfully characterize storage system 100. In some cases, the read channel circuit 110 may include circuitry similar to that discussed in relation to FIG. 3 below; and/or may operate similar to the methods discussed below in relation to FIGS. 4a-4b.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
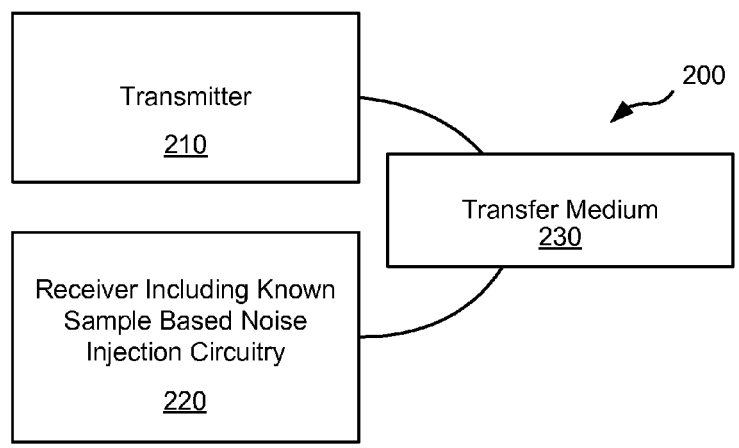
FIG. 2 depicts a data transmission system including known pattern based noise injection circuitry in accordance with one or more embodiments of the present invention.

Turning to FIG. 2, a data transmission system 200 including a receiver 220 having known pattern based noise injection circuitry is shown in accordance with various embodiments of the present invention. The utilized known pattern corresponds to an input expected to be received by receiver 220, and may be stored to a memory area of receiver 220 and accessed when desired. Data transmission system 200 includes a transmitter 210 that is operable to transmit encoded information via a transfer medium 230 as is known in the art. The encoded data is received from transfer medium 230 by a receiver 220. Receiver 220 processes the received input to yield the originally transmitted data.

As part of a device characterization process, receiver 220 monitors a received input stream for a synchronization mark. Once the synchronization mark is found, data received from the receiver 220 is modified by injecting a noise component generated based at least in part on a known data pattern and the received data. The noise being added is designed to raise a minimal error rate generally yielded by receiver 220 to an error rate that can meaningfully characterize data transmission system 200. In some cases, receiver 220 may include circuitry similar to that discussed in relation to FIG. 3 below; and/or may operate similar to the methods discussed below in relation to FIGS. 4a-4b.

Figure 3:
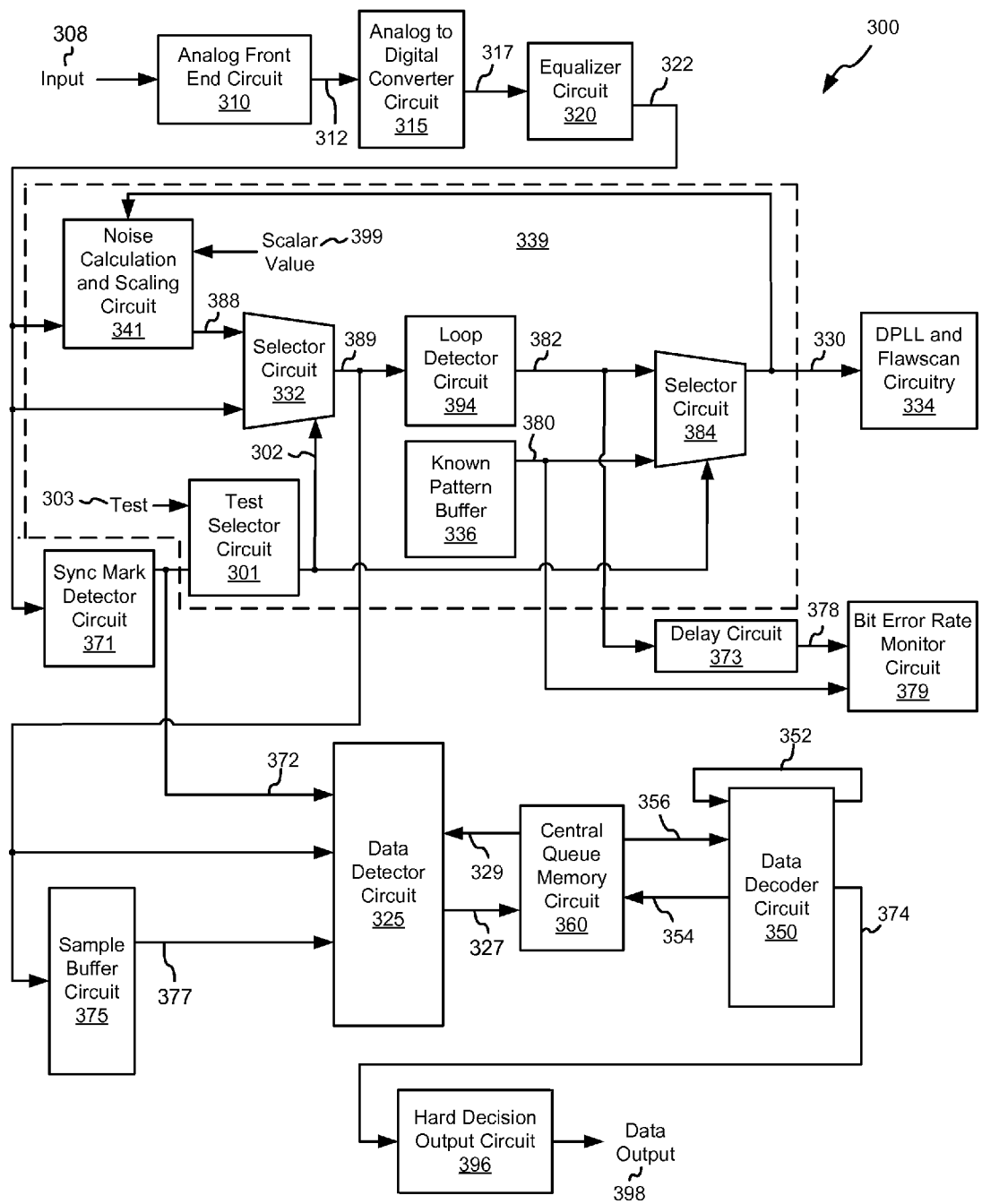
FIG. 3 shows a data processing circuit including a known pattern based noise injection circuit in accordance with some embodiments of the present invention.

FIG. 3 shows a data processing circuit 300 including known pattern based noise injection circuit 339 in accordance with some embodiments of the present invention. Data processing circuit 300 includes an analog front end circuit 310 that receives an analog signal 308. Analog front end circuit 310 processes analog signal 308 and provides a processed analog signal 312 to an analog to digital converter circuit 315. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog input signal 308 is derived from a read/write head assembly (not shown) that is disposed in relation to a storage medium (not shown). In other cases, analog input signal 308 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input signal 308 may be derived.

Analog to digital converter circuit 315 converts processed analog signal 312 into a corresponding series of digital samples 317. Analog to digital converter circuit 315 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 317 are provided to an equalizer circuit 320. Equalizer circuit 320 applies an equalization algorithm to digital samples 317 to yield an equalized output 322. In some embodiments of the present invention, equalizer circuit 320 is a digital finite impulse response filter circuit as are known in the art. It may be possible that equalized output 322 may be received directly from a storage device in, for example, a solid state storage system. In such cases, analog front end circuit 310, analog to digital converter circuit 315 and equalizer circuit 320 may be eliminated where the data is received as a digital data input.

Equalized output 322 is provided to a sync mark detector circuit 371 that is operable to identify a pre-defined synchronization pattern within equalized output 371. In some embodiments of the present invention, sync mark detector circuit 371 is operable to identify a 2T preamble pattern (i.e., a pattern that repeats every two periods) followed by a specific synchronization pattern. When the synchronization pattern is identified, a sync found signal 372 is asserted high. This sync found signal is used to synchronize the processing of user data include within equalized output 322. Based upon the disclosure provided herein, one of ordinary skill in the art will recognize a variety of sync mark detector circuits that may be used in relation to different embodiments of the present invention.

In addition, equalized output 322 is provided to known pattern based noise injection circuit 339. Known pattern based noise injection circuit 339 includes a noise calculation and scaling circuit 341, a selector circuit 332, a test selector circuit 301, a loop detector circuit 394, a know pattern buffer 336, and a selector circuit 384. When an operational degradation of data processing circuit 300 is desired, a test input 303 is asserted high to test selector circuit 301. In turn, test selector circuit 301 asserts a test selection signal 302. In particular, test selection signal 302 is asserted to select test data whenever both sync found 372 (indicating user data is available as part of equalized output 322) and test input 303 is asserted to select operational degradation.

Test selection signal 302 is provided to selector circuit 332. Whenever test selection signal 302 is asserted to select test data, selector circuit 332 provides a noise injected output 388 as a processing output 389. Otherwise, when test selection signal 302 is not asserted to select test data, selector circuit 332 provides equalized output 322 as processing output 389.

Processing output 389 is provided to a loop detector circuit 394 that applies a loop detection algorithm to yield a loop detector output 382. Loop detector circuit 394 may be any circuit known in the art that applies some type of algorithm designed to return a representation of the data from which analog signal 308 was derived. In one particular embodiment of the present invention, loop detector circuit 394 is operable to determine timing feedback and other operations designed to align the sampling of analog to digital converter circuit 315 with the received data set, and/or to adjust a gain applied by analog front end circuit 310. Based upon the disclosure provided herein, one of ordinary skill in the art will recognize a variety of circuits capable of providing a representation of the data from which analog signal 308 was derived that may be used in relation to different embodiments of the present invention.

Known pattern 380 and loop detector output 382 are provided to a selector circuit 384. Selector circuit 384 provides one of known pattern 380 or loop detector output 382 as a feedback output 330 based upon the assertion level of test selection signal 302. Feedback output 330 is provided as a feedback to noise calculation and scaling circuit 341. When a sync mark is found, known pattern 380 is provided as feedback output 330. Known pattern 380 is programmed to be the same as equalized output 322 when the sensing of and processing of input 308 operates properly. Any difference between known pattern 380 and equalized output 322 is typically due to noise. Thus, noise calculation and scaling circuit 341 subtracts feedback output 330 from equalized output 322 to create a noise value. This noise value is then multiplied by a scalar value 399 to yield a scaled noise value. In some cases, scalar value 399 is user programmable, while in other cases scalar value 399 is fixed. This scaled noise value is then added to equalized output 322 to yield noise injected output 388. The addition of the scaled noise to equalized output 322 is done in such a way that the added scaled noise output corresponds to the instance of equalized output 322 from which the underlying noise component was derived. As such, noise injected output 388 includes the scaled noise that corresponds to actual noise in equalized output. In some embodiments of the present invention, the scalar value 399 is user programmable. The following equation represents an example operation of noise calculation and scaling circuit 341:

noise injected output 388=equalized output 322+ scaled noise value, where scaled noise value=scalar value 399*(equalized output 322−feedback output 330).

Again, where test selection signal 302 is asserted to select test data, selector circuit 332 provides noise injected output 388 as processing output 389. Thus, processing output 389 includes injected noise during operational degradation of data processing circuit 300.

Prior to identification of a sync mark when test selection signal 302 is asserted to select loop detector output 382 as feedback output 330, loop detector output 382 is processed by a phase lock loop and flawscan circuitry block 334. The phase lock loop circuitry may be any circuit known in the art that is useful for aligning sampling clocks to a serial input, and the flawscan circuitry may be any flaw scan circuitry known in the art. Upon finding a sync mark, test selection signal 302 is asserted such that selector circuit 332 provides noise injected output 388 in place of equalized output 322 as processing output 389. This results in a change to the latency from analog to digital converter circuit 315 to the output of loop detector circuit 394 due to noise calculation and scaling circuit 341.

This change in latency is detrimental to the immediate operation of the phase lock loop included in phase lock loop and flawscan circuitry block 334. To compensate for this, at the time selector circuit 332 switches from equalized output 322 to noise injected output 388, selector circuit 384 provides known pattern 380 to phase lock loop and flawscan circuitry block 334 in place of loop detector output 382.

Additionally, loop detector output 382 is provided to a delay circuit 373 where it is delayed to yield a delayed output 378 that is aligned with the corresponding value of known pattern 380. The delay enforced by delay circuit 373 corresponds to the latency through loop detector circuit 394. A bit error rate monitor circuit 379 calculates a bit error rate based upon known pattern 380 and delayed output 382. In particular, bit error rate monitor circuit 379 XORs corresponding bits from known pattern 380 and delayed output 382 to yield error indicators. Where the XOR is a logic '1' there is a mismatch between the two outputs indicating an error. Bit error rate monitor circuit 379 calculates both the number of mismatches identified (i.e., when the result of the XOR is a logic '1') and the total number of bits processed. Bit error rate monitor circuit 379 then generates a ratio of the number of mismatches identified to the total number of bits processed which is provided as a bit error rate. As shown, known pattern 380 is used for two processes—to calculate noise data by noise calculation and scaling circuit 341, and to calculate the bit error rate by bit error rate monitor circuit 379. In some embodiments of the present invention, known data 380 is maintained in a memory in data processing circuit 300. The same memory may be used to supply known data 380 to both noise calculation and scaling circuit 341 and to bit error rate monitor circuit 379. In other cases, known data 380 may be supplied from a memory apart from data processing circuit 300 for use by one or both of bit error rate monitor circuit 379 and/or noise calculation and scaling circuit 341.

In addition, processing output 389 is stored to a sample buffer circuit 375 that includes sufficient memory to maintain one or more codewords until processing of that codeword is completed through data detector circuit 325 and a data decoder circuit 350 including, where warranted, multiple "global iterations" defined as passes through both data detector circuit 325 and data decoder circuit 350 and/or "local iterations" defined as passes through data decoding circuit 350 during a given global iteration. Sample buffer circuit 375 stores the received data as buffered data 377.

Data detector circuit 325 is a data detector circuit capable of producing a detected output 327 by applying a data detection algorithm to a data input. As some examples, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Data detector circuit 325 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 327 is provided to a central queue memory circuit 360 that operates to buffer data passed between data detector circuit 325 and data decoder circuit 350. When data decoder circuit 350 is available, data decoder circuit 350 receives detected output 327 from central queue memory 360 as a decoder input 356. Data decoder circuit 350 applies a data decoding algorithm to decoder input 356 in an attempt to recover originally written data. The result of the data decoding algorithm is provided as a decoded output 354. Similar to detected output 327, decoded output 354 may include both hard decisions and soft decisions. For example, data decoder circuit 350 may be any data decoder circuit known in the art that is capable of applying a decoding algorithm to a received input. Data decoder circuit 350 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 350 provides the result of the data decoding algorithm as a data output 374. Data output 374 is provided to a hard decision output circuit 396 where the data is reordered before providing a series of ordered data sets as a data output 398.

One or more iterations through the combination of data detector circuit 325 and data decoder circuit 350 may be made in an effort to converge on the originally written data set. As mentioned above, processing through both the data detector circuit and the data decoder circuit is referred to as a "global iteration". For the first global iteration, data detector circuit 325 applies the data detection algorithm without guidance from a decoded output. For subsequent global iterations, data detector circuit 325 applies the data detection algorithm to buffered data 377 as guided by decoded output 354. Decoded output 354 is received from central queue memory 360 as a detector input 329.

During each global iteration it is possible for data decoder circuit 350 to make one or more local iterations including application of the data decoding algorithm to decoder input 356. For the first local iteration, data decoder circuit 350 applies the data decoder algorithm without guidance from a decoded output 352. For subsequent local iterations, data decoder circuit 350 applies the data decoding algorithm to decoder input 356 as guided by a previous decoded output 352. In some embodiments of the present invention, a default of ten local iterations is allowed for each global iteration.

Figure 4A:
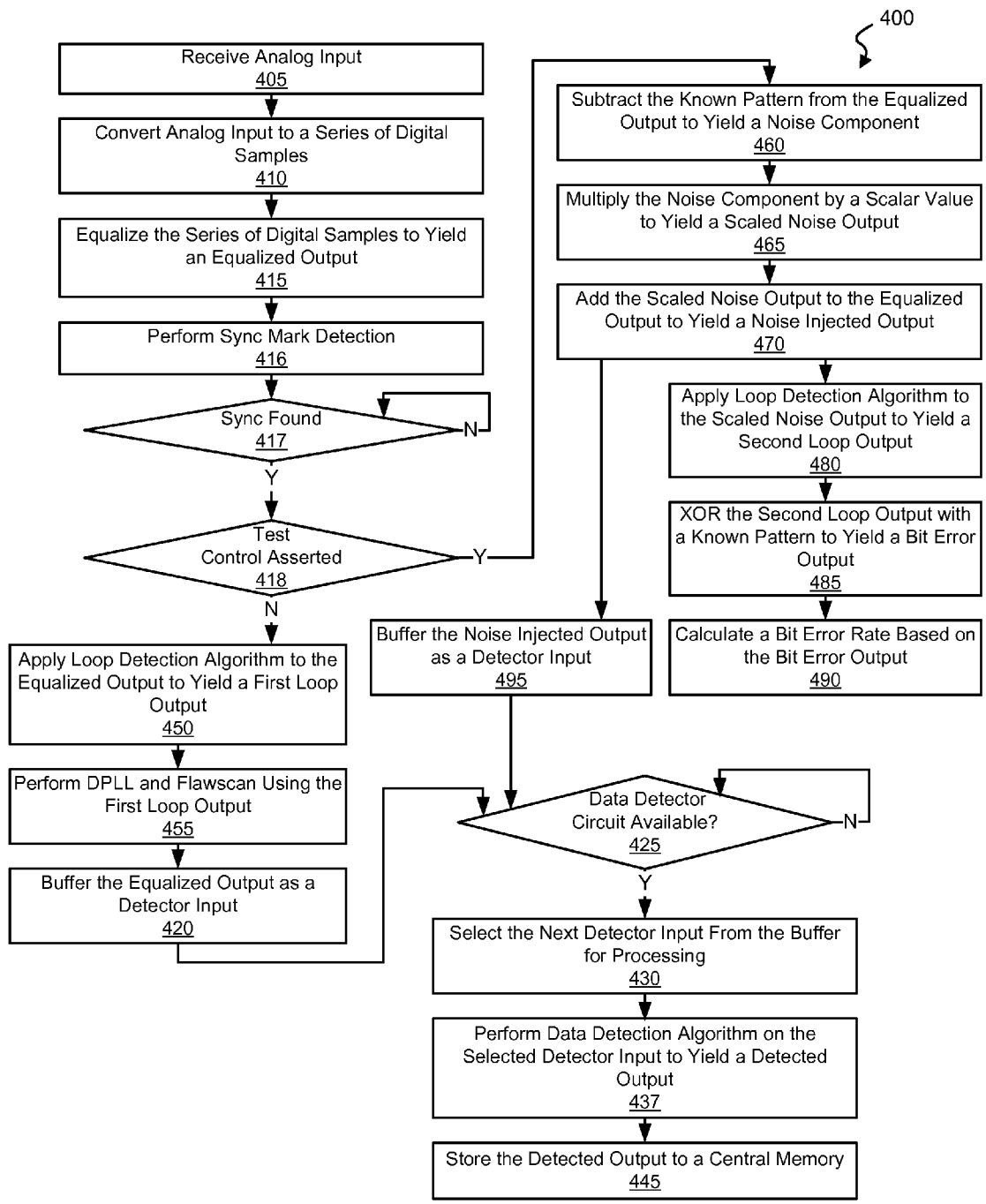
FIGS. 4a-4b are flow diagrams showing a method for data processing relying on known pattern based noise injection in accordance with some embodiments of the present invention.
Figure 4B:
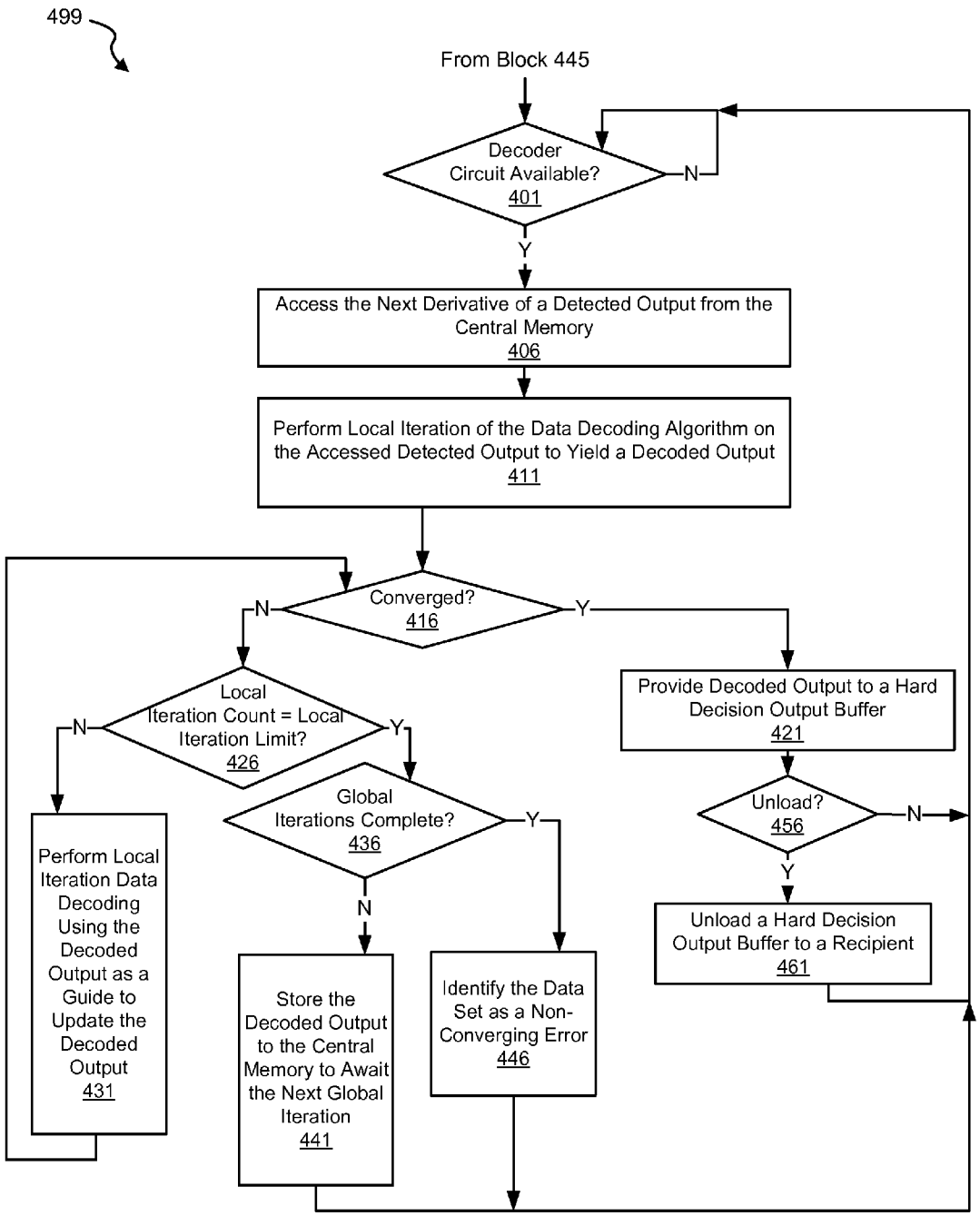

Turning to FIGS. 4a-4b are flow diagrams 400, 499 showing a method for data processing relying on known pattern based noise injection in accordance with some embodiments of the present invention. Following flow diagram 400 of FIG. 4a, an analog input is received (block 405). The analog input may be derived from, for example, a storage medium or a data transmission channel. Based upon the disclosure provided herein, one of ordinary skill in the art will recognize a variety of sources of the analog input. The analog input is converted to a series of digital samples (block 410). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (block 415). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention.

Sync mark detection is applied to the equalized output to identify a sync mark pattern therein (block 416). In some embodiments of the present invention, the sync mark detection is operable to identify a 2T preamble pattern (i.e., a pattern that repeats every two periods) followed by a specific synchronization pattern. When the synchronization pattern is identified, a sync found signal is asserted. The pattern is continuously queried to identify a sync mark that may be used to align user data included within the received equalized output (block 417). Based upon the disclosure provided herein, one of ordinary skill in the art will recognize a variety of sync mark detector circuits and/or detection methods that may be used in relation to different embodiments of the present invention.

Where a sync mark is found (block 417), it is determined whether a test control signal is asserted (block 418). The test control signal is a user programmable signal that is used to indicate whether operational degradation is selected or whether normal operation is selected. Where the test control signal is not asserted (i.e., normal operation is selected) (block 418), a loop detection algorithm is applied to the equalized output to yield a first loop output (block 450). The loop detection algorithm may be applied by any circuit known in the art that applies some type of algorithm designed to return a representation of the data from which the analog input was derived. In one particular embodiment of the present invention, the loop detection algorithm is operable to determine timing feedback and other operations designed to align the sampling related to the analog to digital conversion, and/or to adjust a gain applied by an analog front end circuit. Based upon the disclosure provided herein, one of ordinary skill in the art will recognize a variety of loop detection algorithms capable of providing a representation of the data from which the analog input was derived that may be used in relation to different embodiments of the present invention. Flawscan and phase lock loop processing is performed on the first loop output in accordance with processes known in the art (block 455). In addition, the equalized output is buffered as a detector input (block 420).

Alternatively, where the test control signal is asserted (i.e., degraded operation is selected) (block 418), a known patter is subtracted from the equalized output to yield a noise component (block 460). The known pattern is programmed to be the same as the equalized output when the sensing of and processing of the received analog input operates properly. Thus, for example, where the method is used in relation to a hard disk drive, the known pattern is programmed to be an expected equalized output achieved when reading a defined location on the storage medium where a defined pattern is stored. Any difference between the known pattern and the equalized output is typically due to noise. The noise component is then multiplied by a scalar value to yield a scaled noise output (block 465). In some cases, the scalar value is user programmable, while in other cases the scalar value is fixed. The scaled noise output is then added to the equalized output such that the added scaled noise output corresponds to the instance of the equalized output from which the underlying noise component was derived (block 470).

The loop detection algorithm is applied to the noise injected output to yield a second loop output (block 480). Again, the loop detection algorithm may be applied by any circuit known in the art that applies some type of algorithm designed to return a representation of the data from which the analog input was derived. In one particular embodiment of the present invention, the loop detection algorithm is operable to determine timing feedback and other operations designed to align the sampling related to the analog to digital conversion, and/or to adjust a gain applied by an analog front end circuit. Based upon the disclosure provided herein, one of ordinary skill in the art will recognize a variety of loop detection algorithms capable of providing a representation of the data from which the analog input was derived that may be used in relation to different embodiments of the present invention.

The second loop output is aligned in time with corresponding instances of the known pattern, and the corresponding instances of the known pattern and the second loop output are individually XORd to yield a bit error output (block 485). Where the XOR results in a logic '1' there is a mismatch between the two outputs indicating an error. The number of mismatches identified (i.e., when the result of the XOR is a logic '1') is calculated, and the total number of bits processed is calculated. A bit error rate is calculated as a ratio of the number of mismatches identified to the total number of bits processed which is provided as a bit error rate (block 490).

In addition, where the test control signal is asserted (i.e., degraded operation is selected) (block 418), the noise injected output is buffered as a detector input (block 495). It is determined whether a data detector circuit is available to process the buffered detector input (i.e., either the equalized output in a normal processing mode, or the noise injected output in a degraded operation mode (block 425). Where a data detector circuit is available to process a data set (block 425), the next available equalized output from the buffer is selected for processing (block 430). A data detection algorithm is then applied to the selected equalized output to yield a detected output (block 437). The data detection algorithm may be, for example, a Viterbi algorithm data detection or a maximum a posteriori data detection algorithm. The detected output (or a derivative thereof) is then stored to a central memory (block 445).

Turning to FIG. 4b and following flow diagram 499, it is determined whether a data decoder circuit is available (block 401) in parallel to the previously described data detection process of FIG. 4a. The data decoder circuit may be, for example, a low density parity check data decoder circuit as are known in the art. Where the data decoder circuit is available (block 401) the next derivative of a detected output is selected from the central memory (block 406). The derivative of the detected output may be, for example, an interleaved (shuffled) version of a detected output from the data detector circuit. A first local iteration of a data decoding algorithm is applied by the data decoder circuit to the selected detected output to yield a decoded output (block 411). It is then determined whether the decoded output converged (e.g., resulted in the originally written data as indicated by the lack of remaining unsatisfied checks) (block 416).

Where the decoded output converged (block 416), it is provided as a decoded output codeword to a hard decision output buffer (e.g., a re-ordering buffer) (block 421). It is determined whether the received output codeword is either sequential to a previously reported output codeword in which case reporting the currently received output codeword immediately would be in order, or that the currently received output codeword completes an ordered set of a number of codewords in which case reporting the completed, ordered set of codewords would be in order (block 456). Where the currently received output codeword is either sequential to a previously reported codeword or completes an ordered set of codewords (block 456), the currently received output codeword and, where applicable, other codewords forming an in order sequence of codewords are provided to a recipient as an output (block 461).

Alternatively, where the decoded output failed to converge (e.g., errors remain) (block 416), it is determined whether the number of local iterations already applied equals the maximum number of local iterations (block 426). In some cases, a default seven local iterations are allowed per each global iteration. Based upon the disclosure provided herein, one of ordinary skill in the art will recognize another default number of local iterations that may be used in relation to different embodiments of the present invention. Where another local iteration is allowed (block 426), the data decoding algorithm is applied to the selected data set using the decoded output as a guide to update the decoded output (block 431). The processes of blocks starting at block 416 are repeated for the next local iteration.

Alternatively, where all of the local iterations have occurred (block 426), it is determined whether all of the global iterations have been applied to the currently processing data set (block 436). Where the number of global iterations has not completed (block 436), the decoded output is stored to the central queue memory circuit to await the next global iteration (block 441). Alternatively, where the number of global iterations has completed (block 436), an error is indicated and the data set is identified as non-converging (block 446).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    a known data based noise injection circuit operable to:
        calculate a noise component based upon a data input and a corresponding known pattern;
        add a noise value derived from the noise component to a corresponding instance of the data input to yield a noise injected output; and
        select one of the data input and the noise injected output as a processing input;
    a detector circuit operable to apply a data detection algorithm to the processing input to yield a detected output; and a bit error rate monitor circuit operable to generate a bit error rate based at least in part on a combination of the known pattern and the detected output.

2. The data processing system of claim 1, wherein the data processing system further comprises:
a storage circuit operable to store the known pattern.

3. The data processing system of claim 2, wherein the known pattern is comprised of expected values of the data input pre-stored to the storage circuit.

4. The data processing system of claim 1, wherein the known data based noise injection circuit is further operable to:
multiply the noise component by a scalar value to yield a scaled noise component, wherein the noise value is the scaled noise component.

5. The data processing system of claim 4, wherein the scalar is programmable.

6. The data processing system of claim 1, wherein the bit error rate monitor is operable to XOR corresponding instances of the known pattern and the detected output to yield an error indicator.

7. The data processing system of claim 6, wherein the bit error rate monitor is further operable to calculate a ratio of the number of times the error indicator indicates an error to a total number of bits processed.

8. The data processing system of claim 1, wherein the processing circuit comprises:
a data decoder circuit operable to apply a data decoding algorithm to a decoder input derived from the detected output to yield the data output.

9. The data processing system of claim 8, wherein the data decoder circuit is a low density parity check decoder circuit.

10. The data processing system of claim 1, wherein the data detector circuit is selected from a group consisting of: a maximum a posteriori data detector circuit, and a Viterbi algorithm data detector circuit.

11. The data processing system of claim 1, wherein the system is implemented as an integrated circuit.

12. A method for data processing, the method comprising:
receiving a data input at a noise injection circuit;
calculating a difference between the data input and a known pattern by the noise injection circuit to yield a noise component;
adding a noise value derived from the noise component to a corresponding instance of the data input to yield a noise injected output;
selecting one of the noise injected output and the data input as a processing input; and
applying a data detection algorithm to the processing input to yield a detected output; and
using a bit error rate monitor circuit to generate a bit error rate based at least in part on a combination of the known pattern and the detected output.

13. The method of claim 12, wherein the method further comprises:
storing the known pattern to a storage area of the noise injection circuit.

14. The method of claim 13, wherein the known pattern is comprised of expected values of the data input pre-stored to the storage area.

15. The method of claim 12, the method further comprising:
scaling the noise component to yield a scaled noise component, wherein the noise value is the scaled noise component.

16. A storage device, the storage device comprising:
a storage medium operable to maintain a known read pattern;
a head assembly disposed in relation to the storage medium and operable to provide a sensed signal corresponding to the known read pattern on the storage medium;
a read channel circuit including:
an analog front end circuit operable to provide an analog signal corresponding to the sensed signal;
an analog to digital converter circuit operable to sample the analog signal to yield a series of digital samples;
an equalizer circuit operable to equalize the digital samples corresponding to the data set to yield a sample set;
a known data based noise injection circuit operable to:
calculate noise components based upon the sample set and corresponding instances of a known pattern;
add noise values derived from the noise components to corresponding instances of the sample set yield a noise injected output; and
select one of the data input and the noise injected output as a processing input;
a detector circuit operable to apply a data detection algorithm to the processing input to yield a detected output; and
a bit error rate monitor circuit operable to generate a bit error rate based at least in part on a combination of the known pattern and the detected output.

17. The storage device of claim 16, wherein the read channel circuit further comprises:
a storage circuit operable to store the known pattern.

18. The storage device of claim 17, wherein the known pattern is comprised of expected values of the data input pre-stored to the storage circuit.

19. The storage device of claim 16, wherein the known data based noise injection circuit is further operable to:
multiply the noise components by a scalar value to yield scaled noise components, wherein the noise values are the scaled noise components.

20. The storage device of claim 19, wherein the scalar is programmable.

* * * * *